United States Patent

Kovacs et al.

[11] 3,729,995
[45] May 1, 1973

[54] PRESSURE AND TEMPERATURE COMPENSATION SYSTEM FOR FLOWMETER

[75] Inventors: Laszlo I. Kovacs, Hatboro; Roy F. Schmoock, Ivyland, both of Pa.

[73] Assignee: Fischer & Porter Co., Warminster, Pa.

[22] Filed: Aug. 26, 1971

[21] Appl. No.: 175,082

[52] U.S. Cl.............73/194 B, 73/233, 235/151.34
[51] Int. Cl......................G01f 1/00, G01f 15/02
[58] Field of Search.................73/194, 229, 231, 73/233; 235/151.34

[56] References Cited

UNITED STATES PATENTS

| | | | |
|---|---|---|---|
| 3,176,514 | 4/1965 | Foster | 73/229 |
| 3,279,251 | 10/1966 | Thanaud | 73/194 |
| 3,073,157 | 1/1963 | Gehre | 73/233 |
| 3,588,481 | 6/1971 | Stroman | 235/151.34 |
| 3,385,108 | 5/1968 | Rosso | 73/233 |
| 3,425,274 | 2/1969 | Clement et al. | 73/194 |

*Primary Examiner*—Richard C. Queisser
*Assistant Examiner*—Herbert Goldstein
*Attorney*—Michael Ebert

[57] ABSTRACT

A pressure and temperature compensation system for a gas flowmeter yielding a pulsatory signal whose frequency is a function of flow rate, which signal is affected by changes in the pressure and temperature of the gas being measured. The system includes sensors generating signals proportional to prevailing values of pressure and temperature, the pressure signal being divided by the temperature signal in a divider-converter adapted to produce a variable duty-cycle signal whose duty cycle is proportional to the quotient of the applied signals. The variable duty-cycle signal is multiplied by the pulsatory flowmeter signal, the product thereof being an output signal whose frequency is directly proportional to volumetric flow corrected with respect to both the temperature and pressure.

11 Claims, 7 Drawing Figures

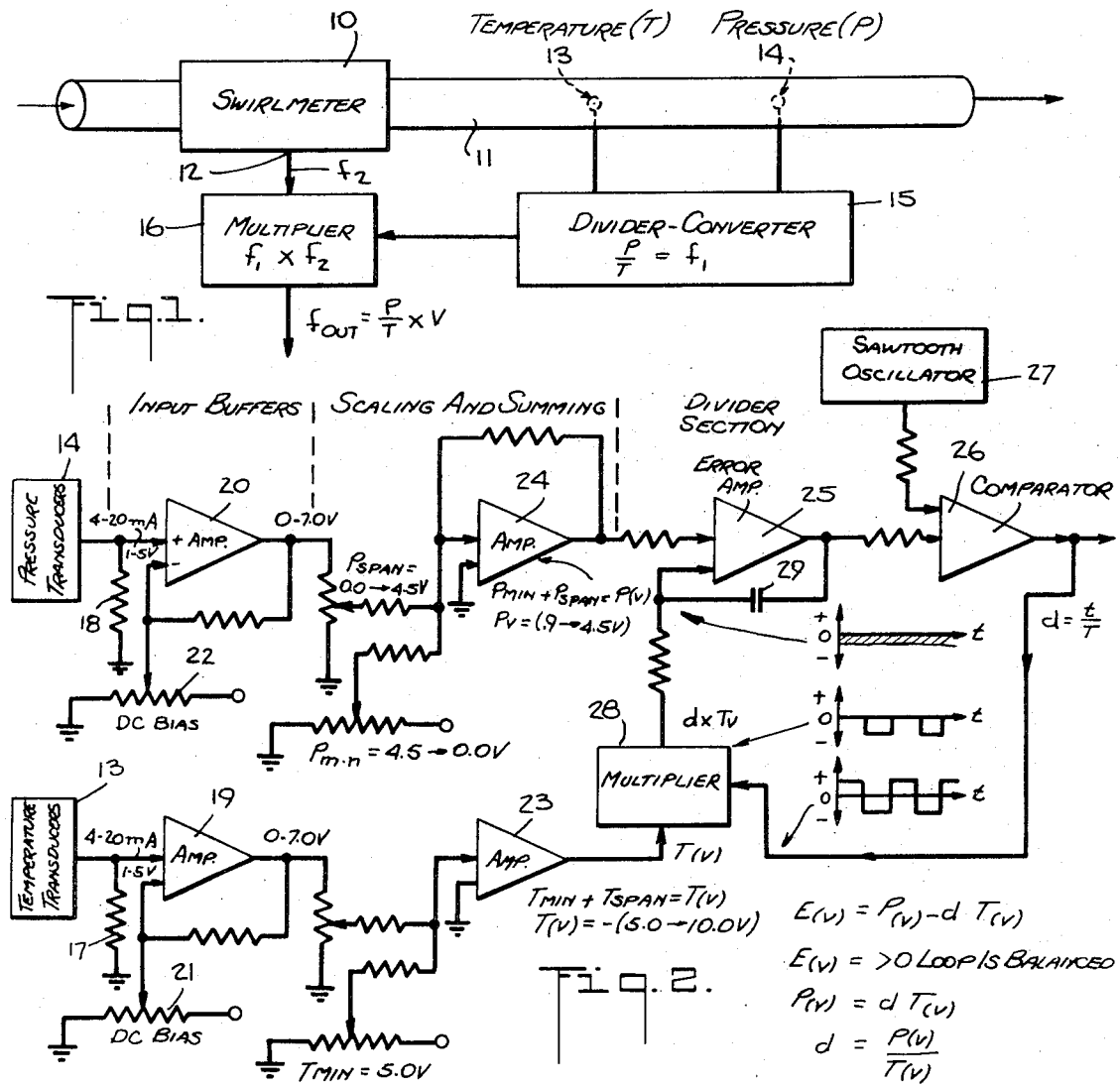
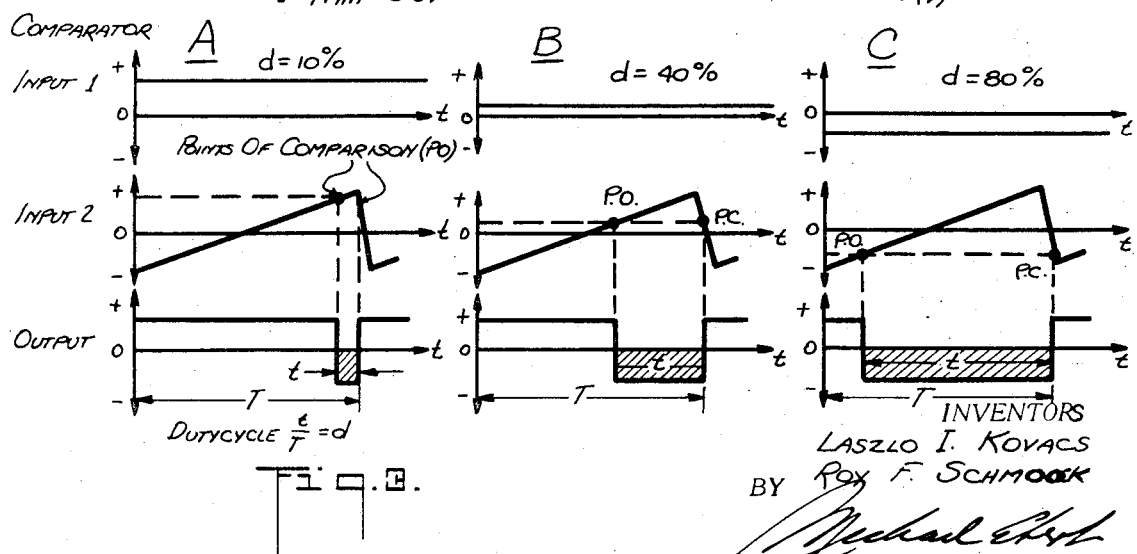

Patented May 1, 1973  3,729,995

INVENTORS
LASZLO I. KOVACS
ROY F. SCHMOCK
BY
ATTORNEY

PRESSURE AND TEMPERATURE COMPENSATION SYSTEM FOR FLOWMETER

BACKGROUND OF THE INVENTION

This invention relates generally to the measurement of gas flow, and more particularly to an automatic pressure and temperature compensation system for a flowmeter producing a digital output signal.

In certain types of flowmeters having moving parts, such as the turbine-type flowmeter, an output signal is generated whose frequency is proportional to the volumetric flow rate of the gas being measured. Also commercially available are flowmeters known as Swirlmeters which have no moving parts and yet generate a digital output signal that varies in frequency in direct proportion to flow velocity.

A detailed description of a Swirlmeter may be found in U.S. Pat. Nos. 3,279,251; 3,314,289 and in U.S. Pat. No. Re 26,410, among others. The advantage of a Swirlmeter over meters having moving parts is that mechanical wear need not be considered and the meter is practically maintenance free. Though the invention will be discussed herein in the context of a Swirlmeter, it is to be understood that it is applicable to any gas-measuring instrument such as a vortex-type meter functioning to generate a digital output whose frequency depends on flow rate.

According to Charles' Law, if a given mass of gas is confined under a constant pressure, its volume will vary directly as a function of its absolute temperature. Boyle's Law, on the other hand, states that the volume of a given mass of gas varies inversely as the absolute pressure of the gas, if the temperature remains constant. The actual mass of the gas subjected to a change in temperature or pressure does not change — only the volume of space occupied by the gas.

The Swirlmeter is a volumetric gas-flow measuring device that generates a given number of pulses for each actual cubic foot of gas passed through the meter. The digital output signal is therefore directly proportional to flow rate, and, as each pulse transmitted represents a discrete measurement increment, the signal pulses can be totalized to provide an accurate record of the cumulative delivered volume.

But since gas measurements are generally given in standard volumes, in order to convert the process variable signal for totalization or rate indication to standard volumes or standard rates, it is necessary to take into account temperature and pressure variations. Further, it is imperative that the form of compensation used be continuous in nature.

Many types of temperature and pressure transducers are commercially available for sensing gas temperature and pressure variations to produce an analog signal which reflects the value sensed. However, not only are electrical analog systems of the type heretofore employed to effect temperature and pressure compensation in a digital-type flowmeter relatively complicated and costly, but they are also somewhat inaccurate.

SUMMARY OF THE INVENTION

In view of the foregoing, it is the main object of this invention to provide an electronic system adapted to effect automatic pressure and temperature correction of digital flow data produced by a flowmeter.

More specifically, it is an object of this invention to provide a system of the above type whose accuracy and performance are superior to existing systems for this purpose, and yet may be manufactured at relatively low cost.

Also an object of the invention is to provide automatic pressure and temperature correction of flow data, which system utilizes a digital multiplying and dividing technique.

Briefly stated, these objects are accomplished in a pressure and temperature compensation system for a flowmeter producing a pulsatory signal whose frequency is a function of flow rate, the system including sensors generating signals proportional to prevailing pressure and temperature values. The pressure signal P is divided by the temperature signal T in a divider-converter to produce a variable duty-cycle signal $f_1$ whose duty cycle is proportional to the quotient of the applied signals. Signal $f_1$ which is equal to P/T, is multiplied in a multiplying gate with the pulsatory flowmeter signal $f_2$, so that the product thereof is a frequency $f_{out}$ directly proportional to volumetric flow corrected with respect to both temperature and pressure.

In the divider-converter, the pressure signal is introduced to an error amplifier whose output is compared with a sawtooth reference voltage. The result of this comparison is a square wave which drives a multiplier placed in the feedback loop of the error amplifier. The second input to the feedback multiplier is the temperature signal T, so that the output of the multiplier serves to drive the error voltage between the two inputs of the error amplifier to zero, whereby the duty cycle of the resultant square wave $f_1$ is then directly proportional to pressure divided by temperature.

Multiplication of square wave $f_1$ and the pulsatory signal $f_2$ from the flowmeter is effected in an AND gate. The duty-cycle signal $f_1$ is applied to one input of the gate whose other input is the flowmeter signal $f_2$, the duty-cycle input acting to turn the gate alternately on and off. When the gate is "on," the pulses of frequency $f_2$ pass therethrough, and when "off," the pulses are blocked. Since the "on" intervals are directly proportional to pressure divided by temperature, the output $f_{out}$ of the gate is directly proportional to the product of pressure divided by temperature times the volumetric frequency provided by the flowmeter. Thus the gate acts effectively as a multiplier to produce pulses whose number depends on flow rate corrected with respect to both temperature and pressure. These pulses, when integrated, provide a corrected analog reading of flow rate.

In the event the signals applied to the gate are harmonically related, the output thereof will be erroneous. To avoid this error, the sawtooth reference in the divider-converter is frequency-modulated, whereby the resultant duty-cycle frequency varies, though its duty cycle stays constant under fixed pressure and temperature input conditions.

OUTLINE OF THE DRAWING

For a better understanding of the invention as well as other objects and further features thereof, reference is made to the following detailed description to be read in conjunction with the accompanying drawing, wherein:

FIG. 1 is a block diagram showing the basic stages of a system in accordance with the invention for correcting the digital output of a flowmeter for varying gas pressure and temperature values;

FIG. 2 is a block diagram of a divider-converter, one of the stages of the correction system;

Figure 4:
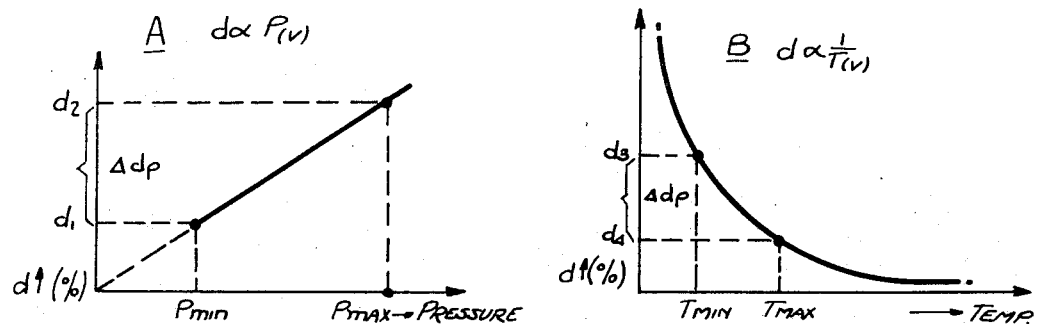
Figures 5, 6:
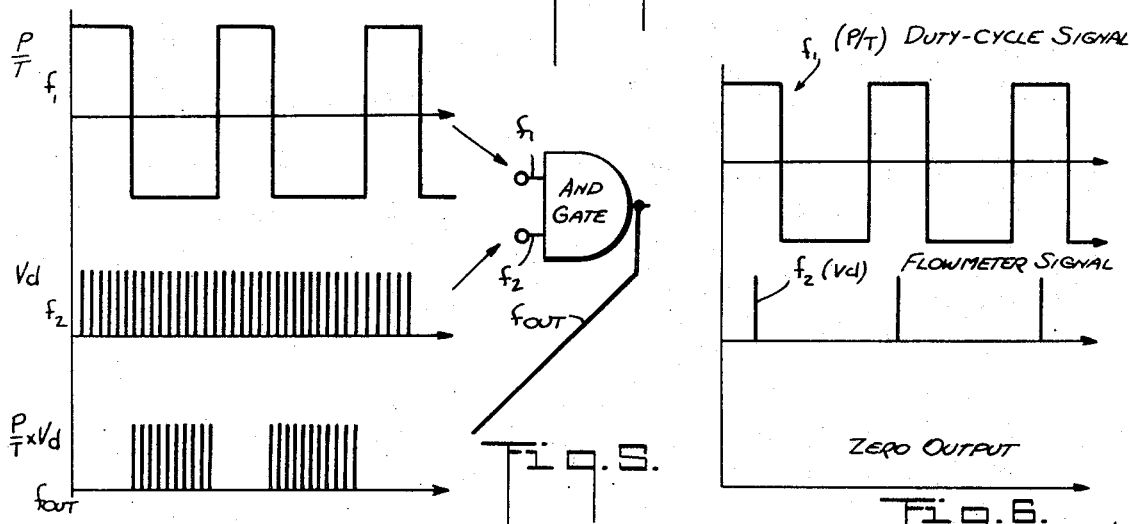
Figure 7:
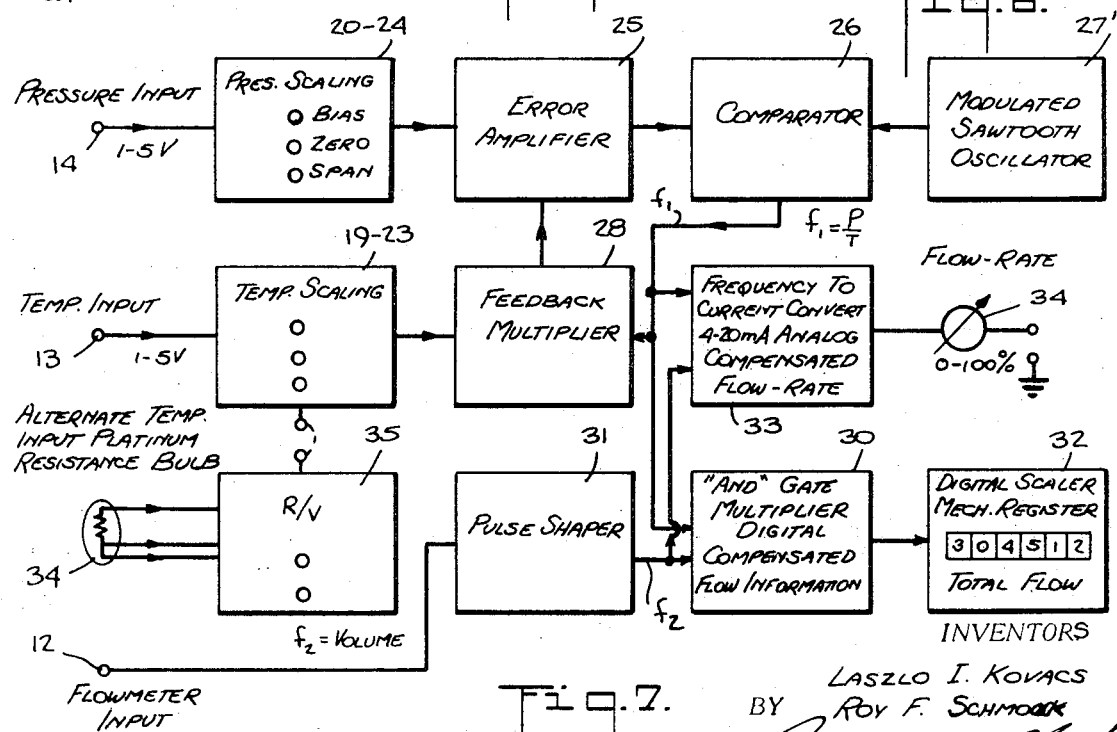

FIGS. 3, A, B and C are graphs illustrative of the operation of the divider-converter;

FIGS. 4, A and B are graphs illustrating the relationship between pressure and temperature and the output of the divider-converter;

FIG. 5 illustrates the wave form of the signals applied to the input of a multiplier gate, another stage of the correction system, and the wave form of the output thereof;

FIG. 6 is a graph illustrative of the operation of the gate under certain conditions;

FIG. 7 is a detailed block diagram of a preferred embodiment of a correction system of the type shown in FIG. 1.

DESCRIPTION OF THE INVENTION

Referring now to FIG. 1, a system in accordance with the invention is shown in combination with a Swirlmeter 10, arranged to measure the rate of flow of gas passing through a pipe 11. The system serves to compensate the output of Swirlmeter 10 for changes in the temperature and pressure of the gas being measured, thereby to afford a true reading of flow rate.

In a Swirlmeter, the incoming gas is forced by a set of swirl blades to assume a swirl component. Downstream of the blades is a Venturi section that first restricts and then expands the flow passage to transform the swirling motion into precessional movement in the expanding region of the Venturi section. Precession takes place about the central axis of the flow tube at a discrete frequency that is a function of flow rate. The cyclic variations in gas velocity occurring by reason of precession, are detected to provide electrical pulses which emerge at the output 12 of the Swirlmeter.

The pressure and temperature correction system includes a temperature sensor 13, disposed in pipe 11 to produce an electrical analog voltage directly proportional to temperature, and a pressure sensor 14 also disposed in the pipe, to produce an electrical analog voltage proportional to temperature, and a pressure sensor 14 also disposed in the pipe, to produce an electrical analog voltage proportional to pressure. In practice, these transducers may be of the type adapted to produce an output in the 1 to 5 volt range.

In order to correct the flowmeter output for the pressure and temperature variables, the output of Swirlmeter 10, whose frequency is represented by $f_2$ must be multiplied by the pressure information and divided by the temperature information. To this end, the pressure value P derived from sensor 14 is first divided in divider-converter 15 with the temperature value T derived from sensor 13 to obtain a variable duty-cycle signal $f_1$.

Signal $f_1$ which is equal to P/T, is multiplied in multiplier 16 with flowmeter output frequency $f_2$ so that the product thereof is a frequency $f_{out}$ which is directly proportional to volumetric flow, corrected with respect to both temperature and pressure.

The division of the pressure signal P with the temperature signal T and the conversion thereof into a variable duty-cycle signal $f_1$, by divider-converter 15, is carried out by a hybrid analog-digital circuit of the type shown in FIG. 2. In this hybrid circuit, pressure signal P is introduced to a high-gain error amplifier, and is compared with a sawtooth reference voltage having a predetermined frequency. The result of this comparison is a square wave which drives a multiplier placed in the feedback loop of the error amplifier. The second input to the feedback multiplier is the temperature signal T, so that the output of the multiplier serves to drive the error voltage between the two inputs of the high-gain amplifier to zero. The duty cycle of the square wave is then directly proportional to pressure divided by temperature.

In FIG. 2 showing the details of the divider-converter 15, current (4–20 ma.) from temperature sensor 13 is conducted through resistor 17 to produce an input signal in an appropriate voltage range (1–5v). Similarly, current from pressure sensor 14 is conducted through resistor 18 to produce an input signal in the desired voltage range. These temperature and pressure signal voltages are buffered through high-input impedance buffer amplifiers 19 and 20, respectively, which are adapted to lift the loading effect from resistors 17 and 18, thereby to maintain a high degree of accuracy. Buffer amplifiers 19 and 20 are provided at their inputs with adjustable de-bias potentiometers 21 and 22, respectively, which are set to subtract 1.0 v to provide zero-based signals of 0–7.0 volts each.

The voltages from input buffer amplifiers 19 and 20 are applied to scaling and summing amplifiers 23 and 24, respectively, where they are scaled and summed with "Null" voltages representing minimum gauge pressure and temperature values in the summing amplifiers. The output of temperature summing amplifier 23 will be 5.0 v to 10.0 v for a 1:2 absolute temperature range, and that of pressure summing amplifier 24 will be 0.90 to 4.5 v for a 1:5 absolute pressure range.

The pressure voltage which is the output of pressure summing amplifier 24 is applied as one input to a high-gain error amplifier 25 whose other input is that percentage of the temperature voltage which is necessary to drive $E_v$ to zero $[E_v = P_{(v)} - d\,T_{(v)}]$. This is accomplished in the following manner:

The output of error amplifier 25 is applied to a comparator 26 to which is also applied, for continuous comparison with the error voltage, the output of a sawtooth oscillator 27, having a predetermined frequency (i.e., 200 $H_z$). The comparator, which is a high-gain differential amplifier, as shown in FIGS. 3A, 3B and 3C, will switch its output state whenever the ramp voltage goes above or below the DC voltage against which it is compared. The output of the comparator is therefore a square wave.

Part of the square wave from comparator 26 (the shaded portion shown in FIGS. 3A, 3B and 3C), is used in a feedback loop including a chopper multiplier 28 where it is multiplied with the temperature voltage from summing amplifier 23, the output from multiplier 28 going into the second input of error amplifier 25. This second input is provided with an integrating capacitor 29 that averages out the output of the multiplier and produces a DC voltage equal to pressure voltage.

At this point the error amplifier is balanced and the square wave's duty cycle $(t)/T$ will remain constant until either value $P_{(v)}$ or $T_{(v)}$ changes. If either input changes, then the error voltage $E_v$ will not be equal to zero so that $E_v$ will then drive comparator 26 to a different duty cycle until a balanced condition is re-established.

Since $E_v = P_{(v)} - d\,T_{(v)}$ if $E_v = 0$ $$0 = P_{(v)} - d\,T_{(v)}$$

$$d = P_{(v)}/T_{(v)}$$

If temperature is fixed, e.g.: $T_{(v)} = 5.0 = T_{minimum}$ and $P_{(v)}$ varies from 0.9V to 4.5V, then:

$$d_1 = 0.9/5 = 0.18 = 18\%$$

$$d_2 = 4.5/5 = 0.9 = 90\%$$

$d_2/d_1 = 90/18 = 5/1$ 1.5 pressure range

If pressure is fixed, e.g.: $P_v = 4.5 = P_{maximum}$ and $T_{(v)}$ varies from 5.0 V to 10.0 V, then $$d_3 = 4.5/5.0 = 0.9$$

$$d_4 = 4.5/10.0 = 0.45$$

$d_4/d_3 = 0.45/0.9 = 0.5/1$ 1:2 temperature range

It is to be noted as shown in FIGS. 4A and 4B, that when $P_{(v)}$ increases, $d$ increases, whereas as $T_{(v)}$ increases, $d$ decreases.

The combined output is the superimposition of these two curves, so that $d = P_{(v)}/T_{(v)}$.

The main feature of the duty cycle feedback is that it does not require a stable sawtooth oscillator, since $T$ and $t$ vary at the same rate, hence $(t)/T$ remains constant. This property readily lends itself for the frequency modulation scheme to provide high accuracy in the multiplier portion of the circuit.

The duty-cycle signal $f_1$ produced in the output of the divider-converter circuit shown in FIG. 2 is then applied to one input of an AND gate 30 shown in FIG. 5, whose other input is $f_2$, the flowmeter output frequency which is shaped into the form of narrow pulses having a repetition rate depending on flow rate, as well as on the prevailing temperature and pressure of the gas being measured.

The duty-cycle input acts to turn the gate alternately on and off, the gate being "on" during the negative periods of the duty cycle, and "off" during the positive intervals thereof. When the gate is "on," the pulses $f_2$ pass therethrough, and when the gate is "off," these pulses are blocked. Since the "on" intervals of the duty cycle are directly proportional to pressure ($P$) divided by temperature ($T$), then the output of the AND gate is directly proportional to the product of pressure divided by temperature times the volumetric information provided by the flowmeter. Thus gate 30 acts effectively as a multiplier to provide pulses whose number depends on flow rate corrected with respect to both temperature and pressure, which pulses when integrated provide a corrected analog reading.

The problem arising when multiplying by the AND gate technique described in connection with FIG. 5 is that as shown in FIG. 6, when the frequency of the duty cycle signal $f_1$ representing $P/T$ is the same as or is harmonically related to the frequency $f_2$ representing the output of the flowmeter, the two signals will appear in the same time position relative to each other, and if this position lies within the "off" interval of the gate, the result is that no output at all will appear. This causes a 100 percent error.

Referring now to FIG. 7, there is shown a preferred embodiment of a system in accordance with the invention, for providing a reading of flow rate corrected for pressure and temperature and avoiding error resulting from harmonically-related signals in the multiplier stage.

Since the signal at terminal 12 from the flowmeter is the result of a gas flow rate which varies over as large as 100 to 1 range, it may, for example, vary from 10 H$_z$ to 1,000 H$_z$. Even though its phase is related to a fixed gating frequency whose duty cycle varies at random, phase-locking to a no output condition is also present.

If, therefore, one frequency modulates the $P/T$ square wave while assuming that its duty cycle stays constant at fixed pressure and temperature input conditions, phase-locking to create a zero output is precluded and the output of the gate multiplier 30 will be free of error.

This is accomplished by using a sawtooth generator 27' which does not have a constant frequency as in the case of oscillator 27 in FIG. 2, but whose frequency varies over a wide range. In practice, one may use a sine-wave oscillator (1 to 2H$_z$) to modulate a current source, the current source feeding a free-running sawtooth generator whose frequency changes as a function of the modulated input current, thereby generating a sawtooth signal whose frequency varies over a wise range. This frequency-modulated sawtooth voltage is applied to comparator 26 where it is compared with the error voltage from error amplifier 25, so that the square wave output duty cycle of the comparator will likewise vary in frequency over a wise range while the duty cycle of each period remains the same and solely dependent on the pressure and temperature inputs.

When the frequency modulated duty cycle signal from comparator 26 is applied to And gate 30 to which is also applied the flowmeter signal from terminal 12 through a pulse shaper 31 which conditions the pulsatory flowmeter signal to provide sharp pulses $f_2$ as shown in FIG. 5, then a random relationship between the input to the gates will also be maintained and no phase-locking will occur. The output of the gate will be free of error and truly proportional to the product of the two input frequencies.

In practice, the output pulses from the gate 30 whose count represents the flow rate corrected for pressure and temperature, may be divided down by a conventional binary divider and applied to a standard mechanical register or digital scaler 32 to provide a reading of total flow rate, or the divided-down pulses may be transmitted to a remote station.

If a reading of compensated flow rate is desired for display or control purposes, the $P/T$ duty cycle output $f_1$ from comparator 26, may be combined with flowmeter frequency $f_2$ in a frequency-to-current converter 33 to produce an analog output, typically 4 to 20 ma., and applied to a current-responsive meter 34 calibrated in terms of flow rate.

Although it is possible to derive an analog flow rate signal from the pulse output of gate 30, the filtering required to smooth out or integrate these pulses would entail a very long time constant. This is because the 100 to 1 frequency range and the 10 to 1 volumetric range would add up to a 1,000 to 1 range in which information is unevenly distributed in the form of burst frequencies.

In practice, for a temperature sensor, one may, in the alternative, use a platinum-resistance bulb 34 whose resistance is proportional to absolute temperature. This change of resistance is sensed by a R/V converter 35 to provide the 1 to 5 voltage signal representing the temperature input to the system.

While therehave been shown and described preferred embodiments of pressure and temperature compensation system for flowmeters, in accordance with the invention, it will be appreciated that many changes and modifications may be made therein without, however, departing from the essential spirit of the invention.

We claim:

1. A pressure and temperature compensation system for a gas flowmeter interposed in a gas conduit and yielding a pulsatory signal whose frequency is a function of flow rate an is affected by changes in the pressure and temperature of the gas being measured, said system comprising:

A. pressure and temperature sensors disposed in said conduit, said sensors generating pressure and temperature signals proportional to prevailing values of the pressure and temperature of the gas flowing through said conduit, B. a divider-converter coupled to said sensors and adapted to divide said pressure signal by said temperature signal and to generate a variable duty signal whose duty-cycle is proportional to the quotient of the applied signals, C. means to multiply the variable duty-cycle signal produced by the divider-converter with the pulsatory signal produced by the flowmeter, the resultant product being in the form of an output signal whose frequency is directly proportional to volumetric flow corrected with respect to both temperature and pressure, and D. means to frequency-modulate said duty-cycle signal prior to multiplication whereby the resultant duty-cycle signal varies in frequency through a predetermined band though its duty-cycle stays constant under constant gas pressure and temperature conditions.

2. A system as set forth in claim 1, wherein said flowmeter is constituted by a meter including swirl blades to impart a swirling motion to the gas and an enlarged section to transform the swirling motion into precessional movement, thereby producing cyclic variations in gas velocity and giving rise to said pulsatory signal.

3. A system as set forth in claim 1, wherein said flowmeter is a vortex-type meter producing said pulsatory signal.

4. A system as set forth in claim 1, wherein said temperature sensor includes a platinum resistance bulb whose resistance is proportional to absolute temperature.

5. A system as set forth in claim 1, further including a frequency-to-current converter coupled to said multiplying means to produce an analog output proportional to the frequency of said output signal.

6. A system as set forth in claim 1, further including means to divide down the frequency of the output signal and to apply the divided-down signal to a numerical register to provide a reading of flow rate.

7. A system as set forth in claim 1, wherein said divider-converter includes an error amplifier having a feedback loop connected to one input thereof, said loop including a multiplier, the pressure signal being applied to the other input of the error amplifier, a comparator coupled to the output of the error amplifier to compare the signal therefrom with a reference sawtooth voltage to produce a square wave which is applied to one input of said multiplier, the temperature signal being applied to the other input of the multiplier, whereby the output of the multiplier serves to drive the error voltage appearing between the inputs of the error amplifier to zero and the duty-cycle of the resultant square wave is then directly proportional to pressure divided by temperature.

8. A system as set forth in claim 7, wherein said pressure signal is applied to said error amplifier through a buffer amplifier, and said temperature signal is applied to said multiplier through a buffer amplifier.

9. A system as set forth in claim 7, wherein said reference sawtooth voltage is derived from a sawtooth oscillator which is frequency modulated.

10. A system as set forth in claim 1, wherein said means to multiply is constituted by an AND gate to which is applied said duty-cycle signal and said pulsatory flowmeter signal, the duty-cycle input serving alternatively to turn the gate "on" and "off" whereby the pulses of the flowmeter signal passes through said gate only during the "on" intervals.

11. A system as set forth in claim 10, further including means to shape the pulsatory signal yielded by the flowmeter to produce relatively narrow pulses for application to said gate.

* * * * *